United States Patent
Gommel et al.

(10) Patent No.: US 8,354,027 B2
(45) Date of Patent: Jan. 15, 2013

(54) SLUDGE EXTRACTION SYSTEM FOR BIOLOGICAL WASTE WATER REACTORS

(75) Inventors: Axel Gommel, Ravensburg (DE); Dieter Efinger, Kumhausen (DE); Werner Gessler, Ravensburg (DE); Ronald Mulder, Alkmaar (NL)

(73) Assignees: Voith Patent GmbH, Heidenheim (DE); Aquatyx Wassertechnik GmbH, Ravensburg (DE)

( * ) Notice: Subject to any disclaimer, the term of this patent is extended or adjusted under 35 U.S.C. 154(b) by 0 days.

(21) Appl. No.: 13/206,168

(22) Filed: Aug. 9, 2011

(65) Prior Publication Data

US 2012/0018372 A1   Jan. 26, 2012

Related U.S. Application Data

(63) Continuation of application No. PCT/EP2010/050611, filed on Jan. 20, 2010.

(30) Foreign Application Priority Data

Feb. 9, 2009 (DE) .................. 10 2009 008 043

(51) Int. Cl.
*C02F 3/28* (2006.01)
*C02F 11/04* (2006.01)
(52) U.S. Cl. ...................... 210/603; 210/260
(58) Field of Classification Search .............. 210/603, 210/188, 259, 260, 532.1
See application file for complete search history.

(56) References Cited

U.S. PATENT DOCUMENTS

| 4,530,762 A | 7/1985 | Love |
| 6,015,496 A | 1/2000 | Khudenko |
| 2006/0163147 A1 | 7/2006 | Dierkes et al. |
| 2010/0000940 A1* | 1/2010 | Menke et al. ............... 210/601 |

FOREIGN PATENT DOCUMENTS

| DE | 28 21 790 C2 | 9/1987 |
| DE | 40 42 223 A1 | 7/1992 |
| EP | 1609763 A1 | 12/2005 |
| GB | 2 046 725 A | 11/1980 |
| JP | 11290887 A | 10/1999 |
| JP | 2007283177 A | 11/2007 |
| WO | WO 2008/006596 A1 * | 1/2008 |

OTHER PUBLICATIONS

International Search Report dated Oct. 5, 2010 for PCT/EP2010/050611. (6 pages).

* cited by examiner

*Primary Examiner* — Fred Prince
(74) *Attorney, Agent, or Firm* — Taylor IP, P.C.

(57) ABSTRACT

A reactor for biological purification of waste water includes a reactor vessel having a substantially flat or a round bottom, at least one supply pipe arranged in a lower region of the reactor vessel for feeding the waste water to be purified into the reactor, at least one fluid discharge pipe for discharging purified waste water from the reactor, at least one solid matter discharge pipe arranged in the lower region of the reactor vessel for discharging solid matter from the reactor and at least one diverting means including at least one diagonally extending section. The at least one diverting means is designed and/or arranged so that solids sinking to the bottom of the reactor from the upper region of the reactor are deflected so that the solids settle in a region of the at least one solid matter discharge pipe and are discharged from the reactor through the at least one solid matter discharge pipe.

34 Claims, 2 Drawing Sheets

SLUDGE EXTRACTION SYSTEM FOR BIOLOGICAL WASTE WATER REACTORS

CROSS REFERENCE TO RELATED APPLICATIONS

This is a continuation of PCT application No. PCT/EP2010/050611, entitled "SLUDGE EXTRACTION SYSTEM FOR BIOLOGICAL WASTEWATER REACTORS", filed Jan. 20, 2010, which is incorporated herein by reference.

BACKGROUND OF THE INVENTION

1. Field of the Invention

The current invention relates to a reactor for biological, in particular anaerobic, purification of waste water including a reactor vessel having a substantially flat or round bottom, at least one supply line arranged in the lower region of the reactor vessel for feeding waste water to be purified into the reactor, at least one fluid discharge pipe for discharging purified waste water from the reactor, and at least one discharge pipe for solid matter arranged in the lower region of the reactor vessel for discharging solid matter from the reactor.

2. Description of the Related Art

A multitude of mechanical, chemical and biological methods and corresponding reactors are known for waste water purification. In biological waste water purification, the waste water to be purified is brought into contact with aerobic or anaerobic micro-organisms, which in the case of aerobic micro-organisms decompose organic contaminants contained in the waste water predominantly to carbon dioxide, biomass and water, and in the case of anaerobic micro-organisms mainly to carbon dioxide and methane and only in small part to biomass. In recent times the biological waste water purification methods are carried out increasingly with anaerobic micro-organisms whereby the reactors, depending on the type and form of the utilized biomass, are categorized for anaerobic waste water purification into contact sludge reactors, upflow anaerobic sludge blanket (UASA) reactors, expanded granular sludge bed (EGSB) reactors, fixed bed reactors and fluidized bed reactors. Whereas the micro-organisms in fixed bed reactors adhere to stationary carrier materials and the micro-organisms in fluidized bed reactors adhere to freely moving, small carrier material; the micro-organisms in UASB and EGSB reactors are utilized in the form of so-called pellets.

In the case of UASB and EGSB reactors, waste water which is to be purified, or a mixture of waste water which is to be purified and already purified waste water from the outlet of the anaerobic reactor, is fed continuously to the reactor through an inlet which is arranged in the lower region of the reactor and is directed through a micro-organism pellet-containing sludge bed which is located above the inlet. During decomposition of the organic compounds from the waste water, the micro-organisms form methane and carbon dioxide containing gas (which is also referred to as biogas) which partially adheres to the micro-organism pellets in the form of small bubbles and which partially rises to the top in the reactor in the form of free gas bubbles. Because of the added gas bubbles the specific weight of the pellets decreases, which is the reason that the pellets rise to the top in the reactor. In order to separate the formed biogas and the rising pellets from the water, separators are arranged in the center and/or upper part of the reactor, mostly in the embodiment of gas hoods under the top of which biogas accumulates, forming gas cushions. Purified water, relieved of gas and micro-organism pellets rises to the top in the reactor and is drawn off at the upper end of the reactor through overflows.

Moreover, during operation of the reactor, solids continuously float downward in the reactor and settle on the reactor bottom from where they are discharged from the reactor through a solid matter discharge pipe. These are, on the one hand, solids contained in the waste water and, on the other hand, solid matter which initially only forms in the reactor, for example in the situation where waste water having a high content of dissolved calcium is used—as for example waste water from the paper industry. Due to chemical conditions, a portion of the calcium precipitates as solid calcium-carbonate. Since the solid matter settles uniformly across the reactor cross section, not all solid matter sediments can be removed in practice from the reactor through the solid matter discharge line. Therefore, large areas of sediment accumulate increasingly on the reactor bottom and in particular at right angle locations in the reactor vessel. In order to remove these sediments from the reactor, the reactor must be shut down from time to time.

To overcome this problem, reactors for biological purification of waste water have been suggested, for example in DE 40 42 223 A1, whereby the lower reactor section tapers conically in the downward direction. This ensures that at least the greater portion of the sediment accumulates in the tip of the cone from where it can be easily discharged from the reactor through a solid matter discharge pipe. This lower conical reactor section must, however, be manufactured from a particularly stable material in order to be able to withstand the weight of the waste water contained in the possibly several meters high reactor. Moreover, manufacture of a reactor of this type is very complicated and therefore expensive.

What is needed in the art is a reactor for biological, in particular anaerobic, purification of waste water from which solid matter occurring during its operation can be easily and in particular completely removed and which is of simple design and can be produced cost effectively. The reactor is to be suitable for purification of calciferous waste water, for example from the paper industry.

SUMMARY OF THE INVENTION

The present invention provides a reactor for biological, in particular anaerobic, purification of waste water including a reactor vessel having a substantially flat or round bottom, at least one supply pipe arranged in the lower region of the reactor vessel for feeding waste water to be purified into the reactor, at least one fluid discharge pipe for discharging purified waste water from the reactor, and at least one discharge pipe for solid matter arranged in the lower region of the reactor vessel for discharging solid matter from the reactor. At least one diverting means is provided in the lower region of the reactor vessel which includes at least one diagonally extending section and which is designed and/or arranged so that solids sinking to the bottom from the upper reactor region are deflected in the reactor such that the solids settle in the region of the at least one solid matter discharge pipe and can thus be discharged from the reactor through the at least one solid matter discharge pipe.

Due to the fact that at least one diverting means is provided in the lower region of the reactor vessel which includes at least one diagonally extending section and which is designed and/or arranged so that solids sinking to the bottom from the upper reactor region are deflected such that in the reactor the solids settle in the region of the solid matter discharge pipe and can thus be discharged from the reactor through the at least one solid matter discharge pipe, the solids sinking downward during reactor operation do not settle uniformly in large areas on the reactor bottom, but are directed in a targeted manner to that location on the reactor bottom where the solid matter discharge pipe(s) is/are located. This achieves a constructively simple and cost effective measure in that solids sinking downward during reactor operation can be completely or at least almost completely removed from the reactor, thereby rendering periodic shut-down of the reactor for the purpose of removing accumulated sediment unnecessary. For these reasons a conically downward tapering reactor section can be foregone in the inventive reactor. Instead, a constructively simpler and more cost effective flat bottom or round bottom is provided in the inventive reactor.

The inventive reactor can have any desired cross sectional shape, for example a round, oval, polygonal, rectangular or square cross section.

According to the invention at least one diverting means is provided in the lower region of the reactor vessel which includes at least one section extending diagonally relative to the horizontal and which is designed/and or arranged so that solids sinking to the bottom from the upper reactor region are deflected in the reactor such that the solids settle in the region of the solid matter discharge pipe and can thus be discharged from the reactor through the solid matter discharge pipe in order to thereby enable complete removal of sediment from the reactor occurring during operation. Basically, the diverting means includes at least one diagonally extending section which can be arranged with the slant in the direction of the solid matter discharge pipe and/or transversely thereto, as long as they effect a previously described diversion of the solid matter. In principle, the diverting means can be flat or round and can have any desired cross sectional form. Moreover, the current invention is not restricted in regard to mounting the at least one diverting means. The at least one diverting means can, therefore, be cantilevered or can be firmly attached to the reactor, for example to the reactor wall.

According to a first embodiment of the current invention, the diverting means is in the embodiment of a deflector plate which, relative to the horizontal, has a slant ($\alpha$) between approximately 10° and 80°, for example between approximately 20° and 70°, approximately between 30° and 60° or between approximately 35° and 50°. A reliable, and in particular a complete diversion of the solids sinking down in the reactor can hereby be achieved, thus ensuring that no solid matter remains adhered on the diverting means.

According to the current invention, the at least one deflector plate is arranged slanted downward, viewed from the outside reactor wall toward the reactor center. This provides that the solids sinking downward in the reactor are directed to the center of the reactor, so that only one and consequently fewer solid matter discharge pipes are required as opposed to when the solid matter is directed to the outside reactor wall.

In order to avoid a mechanical overload of the at least one deflector plate during operation of the reactor due to the weight of the waste water in the reactor and to thereby enable a constructively simple and cost effective embodiment of the at least one deflecting plate, the at least one deflector plate may be arranged so that the waste water in the reactor can flood it from the rear. In this way the at least one deflector plate is subjected to only minimal loads during the operation of the reactor.

An effective diversion of the solid matter can, for example, be achieved in the reactor if two deflector plates are provided in the lower region of the reactor vessel which respectively extend diagonally upward, at a distance from each other from the region of the reactor center in the direction of the reactor outside wall. The two deflector plates may terminate at a distance from the reactor outside wall, so that they can be flooded from the rear in order to minimize the mechanical load. This variation is suitable for reactors having a rectangular or a square cross section.

In order to reliably ensure that the solids sinking over the entire cross section of the reactor are deflected to the center of the reactor, where in this particular embodiment the solid matter discharge pipe is provided, another embodiment of the present invention provides that the two deflector plates are of a size such that they occupy a total of approximately 10 to 95%, for example approximately 30 to 90% or approximately 70 to 90% of the reactor cross section.

In the aforementioned embodiment, the two deflector plates are, for example, arranged in the region of the reactor center at a distance from each other, so that a trough-shaped gap is formed between the two deflector plates. In this instance the solid matter discharge pipe leads into the region of the trough-shaped gap.

Alternatively to the previously described embodiment of the present invention with the two deflector plates, four deflector plates may also be provided in the lower region of the reactor vessel, each of which extend diagonally upward from the region of the reactor center in the direction toward the reactor outside wall, whereby two of the four deflector plates are respectively connected with each other through respectively one of their side surfaces, so that the four deflector plates are arranged in the shape of a truncated pyramid. This embodiment of the present invention is suitable for reactors having a rectangular or square cross section.

According to this embodiment of the present invention, the deflector plates can also be flooded from the rear which can be achieved, for example, in that the four deflector plates terminate at a distance from the reactor outside wall. The four deflector plates occupy, for example, a total of approximately 10 to 95%, approximately 30 to 90% or approximately 70 to 90% of the reactor cross section in order to reliably ensure a diversion of the sinking solids across the entire cross section of the reactor toward to the reactor center.

The four deflector plates can be arranged at a distance from each other in the region of the reactor center so that a rectangular, square, oval or round opening is created between the four deflector plates, viewed cross sectionally. The solid matter discharge pipe leads, for example, into the region of the opening.

According to a second embodiment of the current invention a diverting means is provided in the lower region of the reactor vessel which, viewed from the reactor bottom, has the form of an inverted truncated hollow cone, which is, for example, arranged centered in the reactor. In this way too, reliable diversion of the downward sinking solids in the reactor into the region of the solid matter discharge pipe mouth is achieved through a constructively simple, cost effectively producible diverting means. This embodiment of the present invention is suitable for reactors having, for example, a round or oval cross section. According to this embodiment of the present invention, the diverting means can also be flooded from the rear which is why the outside edge of the truncated hollow cone may be located at a distance from the outside reactor wall. The truncated hollow cone can occupy, for example, approximately 10 to 95%, approximately 30 to 90% or approximately 70 to 90% of the reactor cross section. According to this embodiment of the present invention, the at least one solid matter discharge pipe leads, for example, into the region of the opening provided on the top surface of the truncated hollow cone which can be any desired cross sectional shape, for example round, oval, rectangular or square.

According to a third embodiment of the current invention the at least one diverting means is bulk material arranged on the reactor bottom and is, for example, arranged in the form of a negative cone. The supply pipes should hereby terminate above the bulk material cone. In addition to the fact that in this way too a reliable diversion of the downward sinking solids in the reactor into the region of the solid matter discharge pipe mouth is achieved through a constructively simple, cost effectively producible diverting means this embodiment of the present invention offers the advantage that the diverting means are particularly cost effective. According to this embodiment of the present invention, the at least one solid matter discharge pipe is provided, for example, in the region of the tip of the negative cone of bulk material. A separating wall extending vertically in an upward direction can be provided on the reactor bottom in the region of the center of the reactor and, between the two side surfaces of the separation wall and the reactor outside wall, bulk material may respectively be provided as a diverting means, each in the form of a negative cone. In this embodiment, two solid matter discharge pipes may be provided in the reactor, whereby each respectively leads into the region of the tip of one of the two negative cones of bulk material.

The sediment as bulk material which settles from the waste water may then be purified during operation of the reactor. Accordingly, the present invention further provides a method for biological, in particular anaerobic, purification of waste water, a reactor includes a reactor vessel having a substantially flat or round bottom, at least one supply line arranged in the lower region of the reactor vessel for feeding waste water to be purified into the reactor, at least one fluid discharge pipe for discharging purified waste water from the reactor, and at least one discharge pipe for solid matter arranged in the lower region of the reactor vessel for discharging solid matter from the reactor. In the lower region of the reactor vessel, at least one diverting means is provided which includes at least one diagonally extending section and which is designed and/or arranged so that solids sinking to the bottom from the upper reactor region are deflected in the reactor such that they settle in the region of the at least one solid matter discharge pipe. Water to be purified is supplied and sediments discharged from the reactor through the at least one solid matter discharge pipe.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
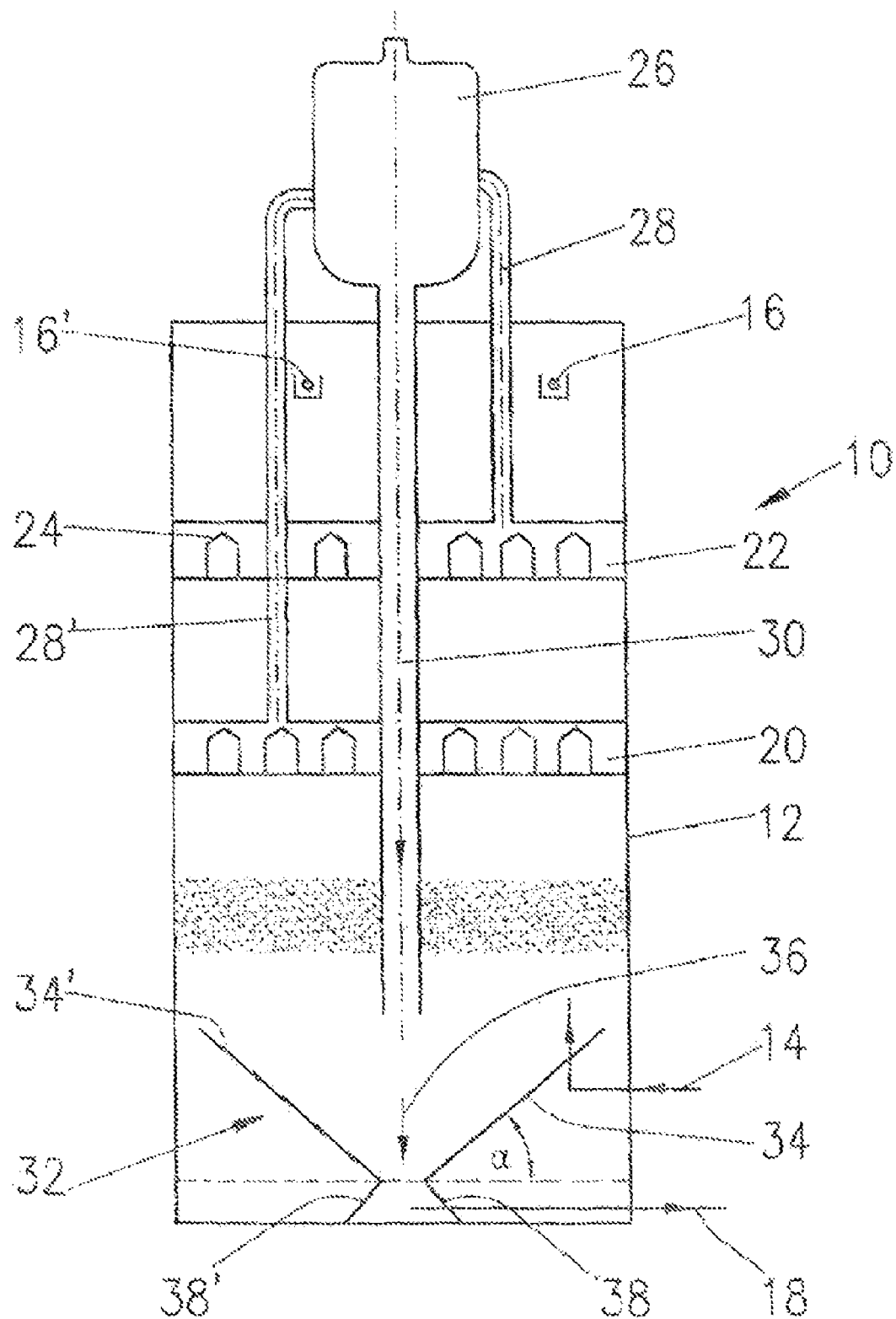
FIG. 1 is a schematic longitudinal sectional view of a reactor for anaerobic purification of waste water according to an embodiment of the current invention.

Referring now to the drawings, and more particularly to FIG. 1, there is shown an embodiment of bioreactor 10 schematically illustrated in a longitudinal view including reactor vessel 12 having a flat bottom. The cross section of the reactor can be round, oval, polygonal, rectangular or square. Supply pipe 14 to feed waste water to be purified leads into reactor 10. Moreover, reactor 10 includes two fluid discharge pipes 16, 16' to discharge purified waste water and solid matter discharge pipe 18 to discharge solid matter from reactor 10.

Two separators 20, 22, each of which each are equipped with several gas hoods 24, are located in the center and upper region of reactor vessel 12. In practical operation, each of separators 20, 22 consists of several tiers of gas hoods 24. For reasons of simplification, only one tier of gas hoods 24 per separator 20, 22 is depicted in FIG. 1. Alternatively, the reactor may also be equipped with only one separator 20, 22 instead of with two different separators 20, 22. Fluid discharge pipes 16, 16' are located above upper separator 22, each in the embodiment of an overflow through which the purified water is drawn from reactor 10.

Gas separation device 26 is arranged on reactor 10 which is connected via pipes 28, 28' with separators 20, 22. In addition, drain pipe 30 leads from the bottom of gas separation device 26 into the lower region of reactor 10.

Finally, diverting means 32 are provided in reactor 10 which include two deflecting plates 34, 34'. Viewed from the reactor outside wall toward the center of the reactor, deflecting plates 34, 34' are arranged in reactor 10 slanting downward whereby—relative to the horizontal which is indicated in FIG. 1 by a broken line—the deflecting plates have a slant ($\alpha$) of approximately 45°. Both deflector plates 34, 34' terminate at a distance from the reactor outside wall, so that they can be flooded from the rear by waste water in the reactor. Between deflector plates 34, 34' trough-type gap 36 is formed into the region of which solid matter pipe 18 leads. Below deflector plates 34, 34' are two baffles 38, 38' extending diagonally to the reactor bottom which prevent distribution of the sediment across the entire cross section of the reactor bottom. To support deflector plates 34, 34', one or more support elements, which are not illustrated in FIG. 1, may be provided per deflector plate 34, 34' which may, for example, be in the embodiment of support rods or support plates, arranged vertically, for example, from the reactor bottom to the underside of the deflector plates 34, 34'.

During operation of the reactor, waste water to be purified is fed into reactor vessel 12 through supply pipe 14, where it mixes with the medium in the reactor which consists of already partially purified waste water, micro-organism pellets which are indicated in FIG. 1 by small dots and small gas bubbles. In the following the term "pellets" is to be understood to be in particular bio-sludge. The furnished waste water flows slowly upward in reactor vessel 12 until it reaches the fermentation zone containing the micro-organism containing sludge pellets. The micro-organisms contained in the pellets decompose the organic contaminates contained in the waste water, predominantly to methane and carbon dioxide gas. Due to the produced gas, gas bubbles occur, the larger of which detach themselves from the pellets and bubble through the medium, whereas the smaller gas bubbles remain adhered to the sludge pellets. The pellets on which small gas bubbles adhere and which, therefore, have a lower specific weight than the other pellets and the water, rise in reactor vessel 12 until they reach lower separator 20.

The free gas bubbles collect in gas hoods 24 and form a gas cushion below the top of gas hoods 24. The gas accumulated in gas hoods 24, as well as a small amount of carried along pellets and water, are discharged, for example, from gas hoods 24 through an opening (not illustrated) which is located on the face side of gas hoods 24, and is fed into gas separation device 26 through pipe 28.

The water, the rising micro-organism pellets and the gas bubbles which were not already separated in lower separator 20, rise further in reactor vessel 12 to upper separator 22. Due to the decrease of the hydrostatic pressure between lower separator 20 and upper separator 22, the remaining small gas bubbles detach from the micro-organism pellets which got into upper separator 22, so that the specific weight of the pellets increases again and the pellets sink downward. The remaining gas bubbles are captured in gas hoods 24 of upper separator 22 and are again transferred into a gas collecting pipe on the face sides of individual gas hoods 24, from where the gas is fed into gas separation device 26 via pipe 28'. The now purified water rises from upper separator 22 further upwards, until it is drawn from reactor 10 through water discharge pipes 16, 16'.

In gas separation device 26 the gas separates from the remaining water and the micro-organism pellets, whereby the suspension consisting of pellets and the waste water recirculates through drain pipe 30 into reactor vessel 12.

Depending on the origin of the waste water furnished to reactor 10 through supply pipe 14, the waste water has greater or lesser solids content. Waste water from the paper industry, for example, contains significant concentrations of solid filler materials and lime. The portion of solids contained in the waste water which exceeds a minimum of specific density, descends downward in reactor 10 after leaving supply pipe 14. Moreover, a portion of the lime contained in the waste water precipitates on the sludge pellets after the waste water has risen into the sludge bed zone. Thus, a portion of the sludge pellets exceeds a critical specific density and therefore also descends from the sludge bed. Due to the geometry and arrangement of diverting means 32 it is ensured that the sinking solids do not accumulate on deflector plates 34, 34', but instead slide off the outside surfaces of deflector plates 34, 34' and accumulate in trough-shaped gap 36 in immediate proximity of solid matter discharge pipe 18, which is why they can be completely removed from reactor 10 through solid matter discharge pipe 18. Removal of the sediment can hereby occur continuously or in batches.

Figure 2:
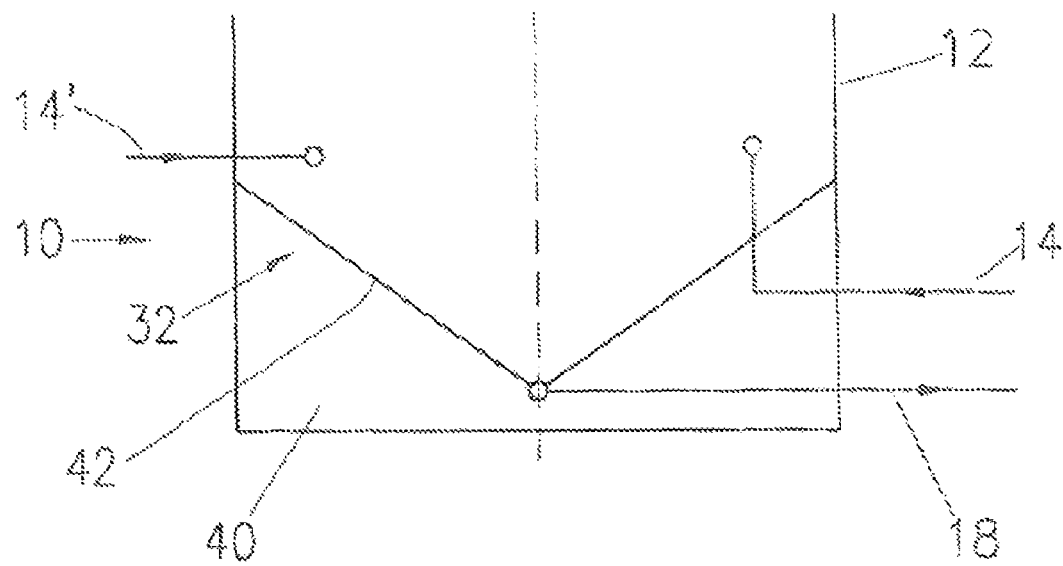
FIG. 2 is a schematic longitudinal sectional view of the lower section of a reactor for anaerobic purification of waste water according to a second embodiment of the current invention.

Referring now to FIG. 2 there is shown a schematic longitudinal view of the lower region of reactor 10 for anaerobic purification of waste water in accordance with a second embodiment of the current invention. In this embodiment, diverting means 32 is provided by bulk material 40 which is arranged in the shape of a negative cone. The surface of negative bulk material cone 40 is indicated in FIG. 2 by reference number 42. During operation of the reactor in accordance with this embodiment of the present invention, the solids descending in reactor 10 are diverted on surface 42 of the negative bulk material cone 40 toward the tip of the negative cone located at the center of the reactor where solid matter discharge pipe 18 is located through which the sediment is completely removed from reactor 10.

Figure 3:
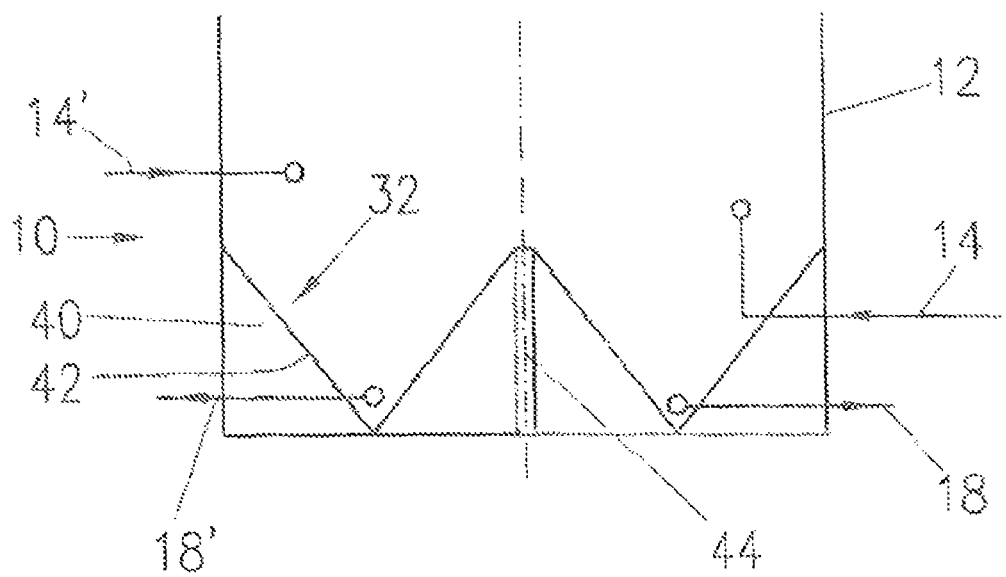
FIG. 3 is a schematic longitudinal sectional view of the lower section of a reactor for anaerobic purification of waste water according to a third embodiment of the current invention.

Referring now to FIG. 3, there is shown a schematic longitudinal view of the lower region of reactor 10 for anaerobic purification of waste water in accordance with a third embodiment of the current invention. In this embodiment, diverting means 32 is also provided by bulk material 40. In contrast to the embodiment illustrated in FIG. 2, separating wall 44 extending vertically in an upward direction is provided, in this instance, on the reactor bottom in the region of the center of the reactor, whereby between the two side surfaces of separation wall 44 and the reactor outside wall bulk material 40 is arranged respectively in the form of a negative cone as diverting means 32. In the respective regions of the tips of the two negative cones, solid matter discharge pipes 18, 18' are provided through which the solid matter is removed from reactor 10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION

| | |
|---|---|
| 10 | Reactor for biological waste water purification |
| 12 | Reactor vessel |
| 14, 14' | Waste water supply pipe |
| 16, 16' | Fluid discharge pipe for purified waste water |
| 18, 18' | Solid matter discharge pipe |
| 20 | Lower separator |
| 22 | Upper separator |
| 24 | Gas hood |
| 26 | Gas separation device |
| 28, 28' | Pipes |
| 30 | Drain pipe |
| 32 | Diverting means |
| 34, 34' | Deflector plate |
| 36 | Trough-shaped gap |
| 38, 38' | Baffles |
| 40 | Bulk material |
| 42 | Surface of negative cone |
| 44 | Separation wall |

What is claimed is:

1. A reactor for biological purification of waste water, the reactor comprising:

a reactor vessel having one of a flat and a round bottom;

at least one supply pipe arranged in a lower region of said reactor vessel configured for feeding the waste water to be purified into the reactor;

at least one fluid discharge pipe fluidly connected to said reactor vessel, said fluid discharge pipe configured for discharging purified waste water from the reactor;

at least one solid matter discharge pipe arranged in said lower region of said reactor vessel and configured for discharging solid matter from the reactor; and at least one diverting means positioned in said lower region of said reactor vessel, said at least one diverting means including at least one diagonally extending section and being arranged so that solids sinking to a bottom of the reactor from an upper region of the reactor are deflected in the reactor so the solids settle in a region of said at least one solid matter discharge pipe and are discharged from the reactor through said at least one solid matter discharge pipe, said at least one diverting means being four deflector plates in said lower region of the reactor vessel, wherein two deflector plates of said four deflector plates are connected with each other along a respective side surface of each of said two deflector plates such that said four deflector plates are arranged to form a truncated pyramid.

2. The reactor according to claim 1, wherein the biological purification is anaerobic purification.

3. The reactor according to claim 1, wherein said diverting means includes at least one deflector plate having a slant relative to horizontal between approximately 10° and 80°.

4. The reactor according to claim 3, wherein said slant relative to horizontal is between approximately 20° and 70°.

5. The reactor according to claim 4, wherein said slant relative to horizontal is between approximately 30° and 60°.

6. The reactor according to claim 5, wherein said slant relative to horizontal is between approximately 35° and 50°.

7. The reactor according to claim 3, wherein said at least one deflector plate is arranged slanted in a downward direction when viewed from an outside wall of the reactor toward a center of the reactor.

8. The reactor according to claim 3, wherein said at least one deflector plate is arranged so that the waste water in the reactor can flood said at least one deflector plate from a rearward direction.

9. The reactor according to claim 3, wherein said at least one deflector plate is two deflector plates provided in said lower region of said reactor vessel, said two deflector plates each extending in a diagonally upward direction and positioned at a distance from each other from a region of said center of the reactor in a direction of said outside wall of the reactor, said two reflector plates terminating at a distance from said outside wall of the reactor.

10. The reactor according to claim 9, wherein said two deflector plates occupy a total of between approximately 10% and 95% of a cross section of the reactor.

11. The reactor according to claim 10, wherein said two deflector plates occupy a total of between approximately 30% and 90% of said cross section of the reactor.

12. The reactor according to claim 11, wherein said two deflector plates occupy a total of between approximately 70% and 90% of said cross section of the reactor.

13. The reactor according to claim 12, wherein said two deflector plates are arranged in said region of said center of the reactor at a distance from each other to form a trough-shaped gap between said two deflector plates.

14. The reactor according to claim 13, wherein said at least one solid matter discharge pipe leads into a region of said trough-shaped gap.

15. The reactor according to claim 1, wherein said four deflector plates terminate at a distance from said outside wall of the reactor.

16. The reactor according to claim 15, wherein said four deflector plates occupy a total of between approximately 10% and 95% of said cross section of the reactor.

17. The reactor according to claim 16, wherein said four deflector plates occupy a total of between approximately 30% and 90% of said cross section of the reactor.

18. The reactor according to claim 17, wherein said four deflector plates occupy a total of between approximately 70% and 90% of said cross section of the reactor.

19. The reactor according to claim 18, wherein said four deflector plates are arranged at a distance from each other in said region of said center of the reactor to form an opening between said four deflector plates when viewed cross sectionally, said opening having one of a rectangular, a square, an oval and a round shape.

20. The reactor according to claim 19, wherein said at least one solid matter discharge pipe is arranged to lead into a region of said opening.

21. The reactor according to claim 1, wherein said at least one diverting means is provided in said lower region of said reactor vessel and is formed as an inverted truncated hollow cone when viewed from a bottom of the reactor.

22. The reactor according to claim 21, wherein said inverted truncated hollow cone is arranged in a center of the reactor.

23. The reactor according to claim 22, wherein an outside edge of said truncated hollow cone is located at a distance from said outside wall of the reactor.

24. The reactor according to claim 23, wherein said truncated hollow cone occupies between approximately 10% and 95% of a cross section of the reactor.

25. The reactor according to claim 24, wherein said truncated hollow cone occupies between approximately 30% and 90% of said cross section of the reactor.

26. The reactor according to claim 25, wherein said truncated hollow cone occupies between approximately 70% and 90% of said cross section of the reactor.

27. The reactor according to claim 26, wherein said at least one solid matter discharge pipe is arranged to lead into a region of an opening on a top surface of said truncated hollow cone.

28. The reactor according to claim 1, wherein said at least one diverting means is a bulk material arranged on a bottom of the reactor and is in the form of a negative cone.

29. The reactor according to claim 28, wherein said at least one solid matter discharge pipe is in a region of a tip of said negative cone of said bulk material.

30. The reactor according to claim 1, further comprising a separating wall having two side surfaces and provided on said bottom of said reactor in a region of a center of the reactor, said at least one diverting means being two diverting means including a bulk material positioned between said two side surfaces of said separation wall and said outside wall of the reactor, said two diverting means each being in the form of a negative cone.

31. The reactor according to claim 30, wherein said at least one solid matter discharge pipe is two solid matter discharge pipes, each of said two solid matter discharge leading to a region of a tip of one of said two negative cones of said bulk material.

32. The reactor according to claim 31, wherein said bulk material is in the form of sediment settled from the waste water to be purified during operation of the reactor.

33. A method for biological purification of waste water in a reactor, the method comprising the steps of:
providing a reactor vessel having one of a flat and a round bottom and including at least one supply pipe arranged in a lower region of said reactor vessel, at least one fluid discharge pipe fluidly connected to said reactor vessel, at least one solid matter discharge pipe arranged in said lower region of said reactor vessel, and at least one diverting means positioned in said lower region of the reactor vessel, said at least one diverting means including at least one diagonally extending section and arranged so that solids sinking to said bottom of the reactor from said upper reactor region are deflected in the reactor so the solids settle in a region of said at least one solid matter discharge pipe, said at least one diverting means being four deflector plates in said lower region of the reactor vessel, wherein two deflector plates of said four deflector plates are connected with each other along a respective side surface of each of said two deflector plates such that said four deflector plates are arranged to form a truncated pyramid;

feeding water to be purified into the reactor through said at least one supply pipe;

discharging purified waste water from the reactor through said at least one fluid discharge pipe;

deflecting solids sinking to a bottom of the reactor from an upper region of the reactor with said at least one diverting means so said solids settle in a region of the at least one solid matter discharge pipe; and discharging solid matter from the reactor through said at least one solid matter discharge pipe.

34. The method for biological purification of waste water according to claim 33, wherein the biological purification is anaerobic purification of waste water.

* * * * *